(12) United States Patent
Sona (10) Patent No.: US 9,423,788 B2
(45) Date of Patent: *Aug. 23, 2016

(54) AUTOMATIC METHOD FOR MILLING COMPLEX CHANNEL-SHAPED CAVITIES

(71) Applicant: D.P. TECHNOLOGY CORP., Camarillo, CA (US)

(72) Inventor: Giuliano Sona, Florence (IT)

(73) Assignee: D.P. TECHNOLOGY CORP., Camarillo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/539,809

(22) Filed: Nov. 12, 2014

(65) Prior Publication Data

US 2015/0168945 A1 Jun. 18, 2015

Related U.S. Application Data

(63) Continuation of application No. PCT/US2013/040651, filed on May 10, 2013, which is a continuation of application No. 13/470,207, filed on May 11, 2012, now Pat. No. 8,977,382.

(51) Int. Cl.
*G05B 19/414* (2006.01)
*G05B 19/19* (2006.01)
(Continued)

(52) U.S. Cl.
CPC .............. *G05B 19/4145* (2013.01); *B23C 3/16* (2013.01); *B23C 3/28* (2013.01); *B23C 3/30* (2013.01);
(Continued)

(58) Field of Classification Search
CPC ................ G05B 19/4093; G05B 2219/35097; G05B 2219/35106; G05B 2219/35215; B23H 2200/00; B23C 3/00; B23C 2220/28; B23C 2220/32; B23C 2220/52; F01C 19/02; F01C 19/08

USPC ........ 700/159, 160, 173, 179–184, 186–188, 700/190–193; 408/20–23, 31–33, 54, 55, 408/199, 200, 203.5, 204; 409/64–66, 409/75–77, 79, 80, 84, 117, 120, 131, 132, 409/142, 183–186, 199, 200; 418/54, 58, 418/60, 61.1, 61.2, 104, 131, 133; 451/64, 451/119, 177

See application file for complete search history.

(56) References Cited

U.S. PATENT DOCUMENTS 3,860,365 A 1/1975 Bibbens
3,916,738 A 11/1975 Neubrand et al.
(Continued)

FOREIGN PATENT DOCUMENTS

CN 101708559 A 5/2010
CN 101733618 A 6/2010
(Continued)

OTHER PUBLICATIONS

Milling with Sinumerik, Mold Making with 3 to 5-axis simultaneuos milling, Manual, Siemens,Feb. 16, 2012[retrieved on Sep. 5, 2013],Retrieved from the Internet: <URL: https://www.automation.siemens.com/doconweb/pdf/SINUMERIK_SINAMICS_03_2013_E/SIN_WF5.pdf?p=1>.
(Continued)

*Primary Examiner* — Crystal J Barnes-Bullock
(74) *Attorney, Agent, or Firm* — Brooks Acordia IP Law, PC; Pejman Yedidsion (57) ABSTRACT

Methods and devices for milling a channel-shaped cavity by a five-axis computer numerical control (CNC) machine by selecting a workpiece to be machined, determining cutting tool flow along the channel-shaped cavity, determining cutting tool in-depth penetration, determining a trochoid path, and determining auxiliary movements.

15 Claims, 11 Drawing Sheets

(51) Int. Cl.
*G05B 19/4093* (2006.01)
*B23C 3/16* (2006.01)
*B23C 3/30* (2006.01)
*B23C 3/28* (2006.01)

(52) U.S. Cl.
CPC ......... *G05B 19/19* (2013.01); *G05B 19/40937* (2013.01); *Y02P 90/265* (2015.11); *Y10T 408/365* (2015.01); *Y10T 408/42* (2015.01); *Y10T 409/300616* (2015.01); *Y10T 409/300896* (2015.01); *Y10T 409/304368* (2015.01); *Y10T 409/306776* (2015.01); *Y10T 409/307616* (2015.01)

(56) References Cited

U.S. PATENT DOCUMENTS

| | | | |
|---|---|---|---|
| 3,964,367 | A | 6/1976 | Stoferle et al. |
| 4,703,146 | A | 10/1987 | Kinoshita |
| 6,869,259 | B2 | 3/2005 | Lebkuechner |
| 7,237,989 | B2 | 7/2007 | Glaesser |
| 8,489,224 | B2 | 7/2013 | Berman et al. |
| 9,052,704 | B2 * | 6/2015 | Berman et al. |
| 2006/0140734 | A1 | 6/2006 | Glaesser |
| 2009/0182449 | A1 | 7/2009 | Frei et al. |

FOREIGN PATENT DOCUMENTS

| | | |
|---|---|---|
| CN | 102298358 A | 12/2011 |
| DE | 103 27 623 B4 | 7/2006 |
| EP | 1 356 866 B1 | 3/2003 |
| EP | 1 638 772 B1 | 6/2004 |

OTHER PUBLICATIONS

Klocke et al., Integrated Approach for a Knowledge-Based Process Layout for Simultaneous 5-Axis Milling of Advanced Materials,Advances in Tribology, vol. 2011, Article ID 742360, 7 pages, 2011,doi:10.1155/2011/742360.

International Search Report for U.S. Appl. No. PCT/US2013/040651 mailed Sep. 11, 2013.

Elber, Cohen and Drake,"C1 Continuous Toolpath Generation Toward 5-axis High Speed Machining",Computer-Aided Design and Applications, 2006.

Supplementary European Search Report for Serial No. EP13787423, mailed Feb. 12, 2016.

Baraki, Soichi,Yamaji, Iwao, Kakino, Yoshiaki, Inoue, Daisuke, & Nishida, Susumu, "Tool Path Planning USing Trochoid Cycles for Hardened Steel in Die and Mold Manufacturing (1st Report)," Proceedings of the 2003 International Conference on Agile Manufacturing , Jan. 1, 2003, pp. 435-442, XP002754161, Retrieved from the Internet: URL:http://mmc.me.kyoto-u.ac.jp/ibaraki/pubs/papers/icam03_ibaraki.pdf[retrieved on Feb. 11, 2016], relevant pp. 435, and 437-439.

* cited by examiner

```
┌─────────────────────────────────────────────┐
│ A SET OF TOOL POSITIONS FLANK MILLING THE RIGHT │
│ WALL OF THE CHANNEL IS PRODUCED ACCORDING   │
│ TO THE GEOMETRIC PROPERTIES OF THE RIGHT    │
│ WALL SURFACE                                │
│ 510                                         │
└─────────────────────────────────────────────┘
                     ↓
┌─────────────────────────────────────────────┐
│ THE PREVIOUS SET IS VERIFIED TO YIELD       │
│ NONCOLLIDING TOOL POSITIONS WITH RESPECT TO │
│ THE BOTTOM SURFACE AND TO COHERENTLY        │
│ REPRODUCE ANY SYMMETRIES THE BOTTOM         │
│ SURFACE MAY HAVE                            │
│ 520                                         │
└─────────────────────────────────────────────┘
                     ↓
┌─────────────────────────────────────────────┐
│ IN CASE OF COLLISIONS WITH THE BOTTOM       │
│ SURFACE, OR OF VIOLATION OF OTHER           │
│ TECHNOLOGICAL CONSTRAINTS, THE PREVIOUS SET │
│ IS CONTINUOUSLY AND ADAPTIVELY MODIFIED IN  │
│ ORDER TO PRODUCE THE CLOSEST POSSIBLE       │
│ COLLISION-FREE TOOL POSITIONS CONFIGURATION │
│ 530                                         │
└─────────────────────────────────────────────┘
                     ↓
┌─────────────────────────────────────────────┐
│ THE SAME PROCEDURE (510—520—530) IS APPLIED │
│ TO THE LEFT WALL OF THE CHANNEL             │
│ 540                                         │
└─────────────────────────────────────────────┘
```

AUTOMATIC METHOD FOR MILLING COMPLEX CHANNEL-SHAPED CAVITIES

CROSS-REFERENCE TO RELATED APPLICATIONS

This application is a continuation of International Patent Application No. PCT/US13/40651 filed May 10, 2013, which claims priority to and the benefit of Non-provisional patent application Ser. No. 13/470,207 filed May 11, 2012, the contents of both are hereby incorporated by reference herein for all purposes.

TECHNICAL FIELD

The invention in its several embodiments relates generally to tool path trajectory planning for computer-aided manufacturing (CAM) and more particularly to the computer-assisted milling of complex channel-shaped cavities using multi-axis machine tools.

BACKGROUND

CAM software systems are used to program computer numerical control (CNC) machine tools that are used in machine shops for the production of discrete parts, such as molds, dies, tools, prototypes, and aerospace components. The variety of shapes that can be machined is nearly infinite: shapes are usually classified according to convenient mathematical structures, often involving the use of sub-fields of mathematics, e.g., topology.

A "channel" shape is a simple primitive geometric concept, familiar also to non-technicians. A simple and intuitive description of a channel may be done by specifying a left lateral wall and a right lateral wall whose baselines are joined by a bottom surface. Such a shape occurs in most of the parts being dealt with in the CAM production environment; in particular, there is a wide variety of channel shapes in the specific area of production of gears, impellers, propellers, pumping and moving devices, and blisks—types of compressors obtained by the junction of blades and disks. The different channels may differ, one from another, with respect to: height of the walls, curvature of the wall surfaces and of the bottom surface, relative position of the walls, constant or non-constant width of the channel, thickness of the wall surfaces, and other geometric parameters. The milling of such channels may be a delicate process where several mechanical and geometric constraints may need to be taken into account. Manufacturing a design surface by a numerically controlled (NC) machine may comprise two stages: a rough cutting and a finish machining.

During the rough cutting, the raw material must be removed as fast as practicable while ensuring neither excessive cutting nor gouging, i.e., where the cutting tool removes a portion of rough material that is instead required to belong to the final targeted shape, introducing thereby an irreparable mistake or blemish into the entire milling process. Moreover, the rate of contact between the cutting tool and the rough material to be removed cannot exceed a prescribed threshold; a threshold which depends on the shape of the cutter end, i.e., usually flat, spherical or torical—the latter being an intermediate shape between the first two, and on the type of rough material being removed.

During the finish machining, the tool may be placed so as to have the maximal contact with the surface, so as to remove the remaining excess and create a well-finished and accurate surface. In both stages, i.e., the rough cutting stage and the finish machining stage, the possible onset of vibrations and motion instability of the cutting tool, also termed chatter in the CAM Lexicon, must be kept under control in order to reduce the mechanical pressure on the channel walls; walls that may be very thin—a particularly important consideration for channels having deep cavities.

SUMMARY

Embodiments may include a method of milling a channel-shaped cavity by a five-axis computer numerical control (CNC) machine, where the method may comprise: selecting a workpiece to be machined, where the workpiece has a bottom surface of a channel, a left wall of the channel, a right wall of the channel, and an entry point of a cutting tool; determining a primary set of flank-milling positions of the cutting tool; and determining a trochoidal path for the cutting tool. Some exemplary embodiments of the method may further comprise determining auxiliary movements of the cutting tool. Some exemplary embodiments of the method may further comprise outputting one or more cutting tool movements as one or more machine instructions, where the one or more cutting tool movements may be based on at least one of: the selected workpiece, the determined primary set of flank-milling positions, the determined trochoidal path, and the determined auxiliary movements. Some exemplary embodiments of the method may further comprise replicating, for each depth-level of an incrementally lower depth-level, at least one of: determining a primary set of flank-milling positions of the cutting tool; determining a trochoidal path for the cutting tool; and determining auxiliary movements of the cutting tool. In some exemplary embodiments of the method, determining the primary set of flank-milling positions of the cutting tool may further comprise: analyzing the bottom surface of the workpiece channel; determining possible geometric symmetries based on the analyzed bottom surface of the workpiece channel; propagating curves containing the determined possible geometric symmetries onto the left wall of the workpiece channel and onto the right wall of the workpiece channel; analyzing a relative shift position of the left wall of the workpiece channel; analyzing a relative shift position of the right wall of the workpiece channel; and generating an updated geometric database containing the propagated curves containing the determined possible geometric symmetries of the analyzed left wall of the workpiece channel and containing the determined possible geometric symmetries of the analyzed right wall of the workpiece channel relative to the bottom surface of the workpiece channel. In some exemplary embodiments of the method, determining auxiliary movements of the tool may further comprise at least one of: approaching a part of the workpiece; detaching the tool from a part of the workpiece; connecting movements between sub-areas of the tool path as rapid links; adding a polishing finish pass, where the polishing finish pass may be based on the determined trochoidal path for the cutting tool; and determining a final tool path. In some exemplary embodiments of the method, determining the trochoidal path for the cutting tool may further comprise: determining a geometric cutting tool position; determining a relative interaction of the workpiece to be machined and the determined geometric cutting tool position; determining if the determined relative interaction of the workpiece to be machined and the determined geometric cutting tool position satisfies a defined set of technological constraints, where the defined set of technological constraints comprises at least one technological constraint; if the defined set of technological constraints is not satisfied, then determining a new geometric cutting tool position, where the determined new geometric cutting tool position may be based on the determined relative interaction of the workpiece to be machined and the determined geometric cutting tool position, and the determined satisfaction of the at least one technological constraint; and outputting the determined new geometric cutting tool position to be used in determining the relative interaction of the workpiece to be machined and the determined geometric cutting tool position; and if the defined set of technological constraints is satisfied, then accepting the geometric cutting tool position. In some exemplary embodiments of the method, determining the geometric cutting tool position may further comprise: determining a set of geometric cutting tool positions for the selected right wall of the workpiece channel; verifying the determined set of geometric cutting tool positions for the selected right wall of the workpiece channel for non-colliding cutting tool positions with respect to the bottom surface of the workpiece channel; reproducing any symmetries on the bottom surface of the workpiece channel; modifying the determined set of geometric cutting tool positions for the selected right wall of the workpiece channel if at least one of the following occurs: a collision occurs with the bottom surface of the workpiece channel, and at least one technological constraint in the defined set of technological constraints may be violated; determining a set of geometric cutting tool positions for the selected left wall of the workpiece channel; verifying the determined set of geometric cutting tool positions for the selected left wall of the workpiece channel for non-colliding cutting tool positions with respect to the bottom surface of the workpiece channel; reproducing any symmetries on the bottom surface of the workpiece channel; and modifying the determined set of geometric cutting tool positions for the selected left wall of the workpiece channel if at least one of the following occurs: a collision occurs with the bottom surface of the workpiece channel, and at least one technological constraint in the defined set of technological constraints may be violated. In some exemplary embodiments of the method, determining the relative interaction of the workpiece to be machined and the determined geometric cutting tool position may further comprise: verifying the trochoidal path for the cutting tool does not collide with at least one of: the bottom surface of the channel, the left wall of the channel, and the right wall of the channel; verifying the trochoidal path for the cutting tool does not generate a cutting tool engagement greater than a cutting tool engagement limit; and verifying the trochoidal path for the cutting tool has a local curvature that permits the cutting tool to be moved at a speed above a set preferred speed.

Embodiments may also include a device for generating instructions for a five-axis machining tool, the device comprising: a processing module having addressable memory, the processing module configured to: repeat the following steps for a channel-shaped cavity, while at least one machining limitation parameter may not satisfied: determine cutting tool flow along the channel-shaped cavity; determine cutting tool in-depth penetration from a top surface of the channel-shaped cavity towards a bottom surface of the channel-shaped cavity; and determine a trochoid path for the cutting tool based on the determined cutting tool flow along the channel-shaped cavity and the determined cutting tool in-depth penetration. In some exemplary embodiments of the device, the processing module may be further configured to: select the channel-shaped cavity to be machined, where the channel-shaped cavity has a bottom surface, a left wall, a right wall, and an entry point of the cutting tool. In some exemplary embodiments of the device, the processing module may be further configured to: determine a primary set of flank-milling tool positions relative to the right wall; and determine a primary set of flank-milling tool positions relative to the left wall; where the determined cutting tool flow along the channel-shaped cavity may be based on the determined primary set of flank-milling tool positions relative to the right wall and the determined primary set of flank-milling tool positions relative to the left wall. In some exemplary embodiments of the device, the processing module may be further configured to: determine auxiliary movements, where auxiliary movements may be at least one of: approach the channel-shaped cavity; detach from the channel-shaped cavity; connect movements of the cutting tool between sub-areas; add a polishing finish pass, where the polishing finish pass may be based on the determined trochoid path for the cutting tool; and determine a final tool path. In some exemplary embodiments of the device, the at least one machining limitation parameter may be at least one of: the geometric shape of the channel prohibits an additional pass, and the machining tolerance may be less than required for an additional pass. In some exemplary embodiments of the device, the step to determine the trochoid path for the cutting tool may be further based on at least one of: an axial cutting tool engagement, a radial cutting tool engagement, an at least one cutting tool speed parameter, and an interaction of the bottom surface of the channel-shaped cavity with the trochoid path.

BRIEF DESCRIPTION OF DRAWINGS

Embodiments may be illustrated by way of example and not limitation in the figures of the accompanying drawings, and in which.

DETAILED DESCRIPTION

The present embodiments may utilize a structured combination of: 5-axis flank-machining, high speed machining allowed by adaptive analysis of geometrical data and technological constraints, and a channel-dedicated roughing cycle. 5-axis numerically controlled (5-axis NC) machines may be characterized by three translational axes and two rotary axes: the two rotary positions, which may be designated with the letters A, B or C, define, depending on the mechanical configuration of the particular machine tool, respectively, the position about the axis X, Y, or Z. The two rotary axes add two degrees of freedom to the range of spatial movements that the cutting tool is able to perform; in particular, they represent a technological enhancement when compared to 3-axis NC machines, where two rotary axes are missing and only translational movements of the cutting tool are possible. This increased flexibility of the cutting tool positions may result in: a) shorter machining times; and b) the rough material being removed in a way to reproduce the desired target shape more consistently.

The cost for these improvements is that the calculated trajectory of the cutting tool must satisfy more constraints than in the 3-axis case, i.e., there is much more to control in terms of possible unwanted collisions between the cutting tool apparatus and the rough material. In addition, the amount of cutting load, i.e., the so-called "tool-engagement" that represents the amount of rough material instantly removed by the cutting tool, may, more readily than in the 3-axis case, increase beyond the mechanical limits sustainable by the cutting tool apparatus. Moreover, the cutting portion of the tool typically comprises its tip and a portion of the shank. The tip may be flat, spherical, or torical, where torical is an intermediate shape between a flat-shaped cutting tip and a spherical cutting tip. A portion of the shank may be a portion of either a cylindrical or conical lateral surface. Accordingly, the tool may cut rough material either with its tip or with its shank. Flank milling may be more productive, since it allows larger removal rates of rough material, and it exploits more effectively the cutting sub-area of the cutting tool. The tool-engagement may be split into a radial component, corresponding to tip point milling, and an axial component, corresponding to flank milling.

Exemplary embodiments may comprise a channel-shape suited cutting-tool trajectory calculation, which is called 5-axis-Trochoidal-Channel-Roughing (5-axis TCR). A trochoid is the path traced by a point fixed on a circle that rolls along a line. This definition is generalized to a circle rolling along a general three-dimensional curve which is continually adapted to the shape of the channel being machined, in particular: to its left wall, right wall, and bottom surface.

Trochoidal motion has several advantages. One advantage is that the cutting tool always removes material with its flank, which allows for a higher machining speed. Another advantage is that only a small area of the cutting tool is engaged at any one time. Trochoidal motion presents many complications when applied to 5-axis NC.

To calculate an efficient 5-axis continual or continuous trochoidal roughing movement of the cutting tool, 5-axis TCR may perform five steps. This first step is called symmetry propagation and automatic synchronization, and it involves a thorough geometrical analysis of the specific features of the channel to be machined. In particular, a) the information about possible elements of symmetry of the bottom surface may be propagated to the channel walls; and b) the relative position of the left wall and right wall of the channel may be assessed, and a resulting correspondence of subportions of the right side of the channel with counterparts on the left side of the channel may be established.

The second step is flank pass production. In this step, a) a primary set of flank-milling tool positions relative to the right wall is calculated; and b) a primary set of flank-milling tool positions relative to the left wall is calculated.

The third step is the trochoid generation step. In this step, the corresponding elements of the first step and the second step may be joined via pseudo-circular patterns; patterns that typically yield a characteristic trochoidal path. During this step, the tool engagement is point-wise evaluated and the trochoidal passes may be adaptively changed, e.g., in the event that the limit engagement threshold is exceeded.

The fourth step is the incremental step. In this step, the previous three-step sequence, i.e., synchronization—flank pass—trochoid, is repeatedly replicated, i.e., iterated at lower levels of amplitude, or cutting load, and done so inside the channel. This process allows a gradual removal of the rough material by keeping a low rate of cutting load. There may be many of these replications and the number of them depends on the geometric shape of the channel, the mechanical characteristics of the cutting tool used, and the degree of precision, i.e., the so-called machining tolerance, that the 5-axis TCR machining is asked to provide. These parameters may also affect the relative depth-distance of two adjacent levels.

The fifth step is the auxiliary movements step. This step comprises the addition of auxiliary movements to the tool trajectory; where the auxiliary movements desired of the tool are calculated according to the above specification, e.g., with respect to cutting loads and target dimensions. The fifth step may include the execution of an optional finishing pass.

The symmetry propagation and automatic synchronization step takes into account the tool flow along the channel, whereas the flank pass production step considers the transversal direction instead: that is, it produces the tool in-depth penetration from the top of the channel toward its bottom surface. The trochoid generation step may deal with various technological aspects including tool engagement, i.e., axial and radial engagement, tool high-speed motion, and interaction of the bottom surface of the channel with the cutting tool trajectory. The incremental step repeats the prior steps to complete a roughing operation, depending on the depth of the channel, as it may be impracticable to remove all the rough material from the channel through a single synchronization—flank pass—trochoid sequence. The auxiliary movements step may yield the necessary links and offers the possibility to polish the final result by exploiting the same geometric information, and in particular the flank pass production step, used for producing the trochoidal passes.

Figure 1:
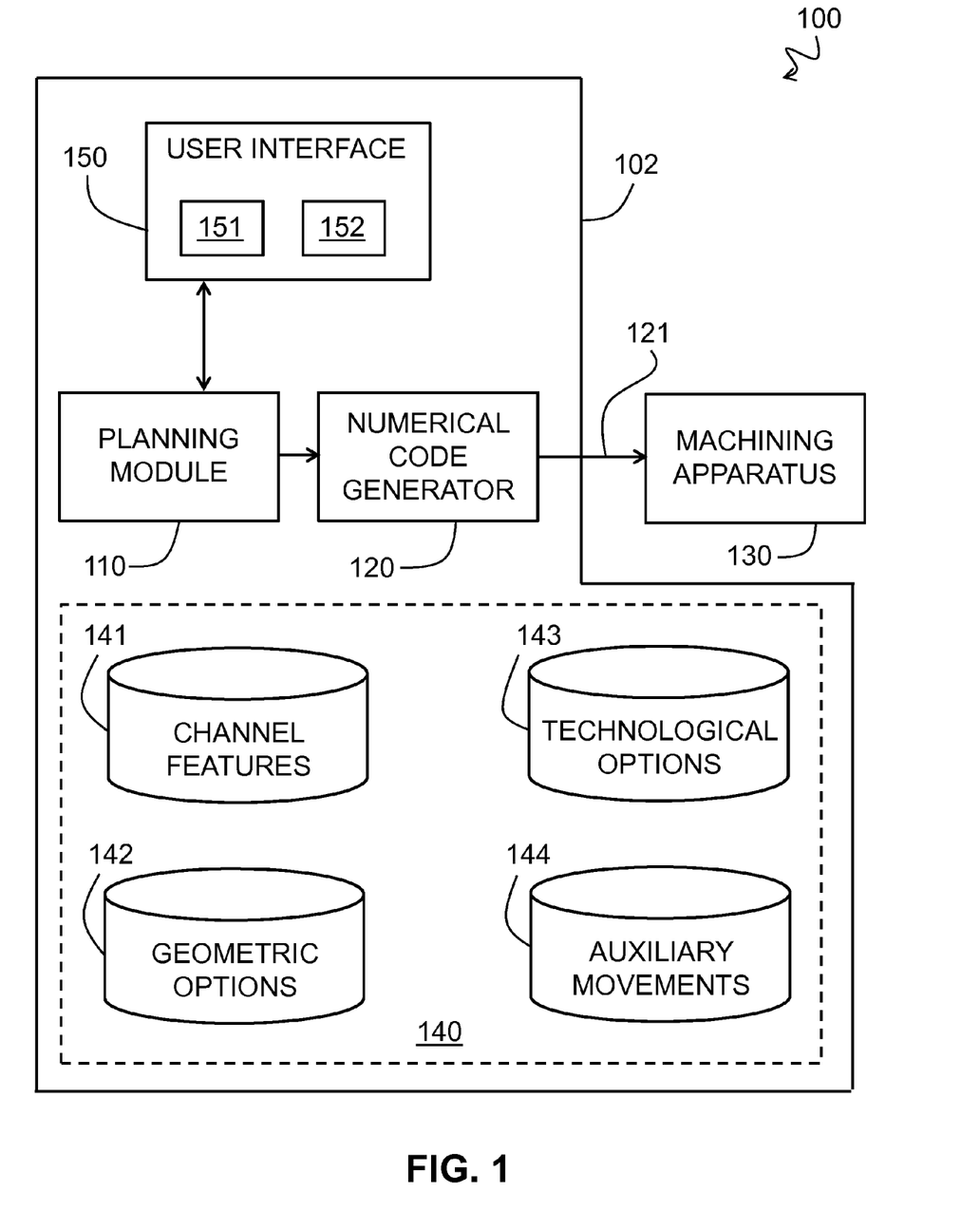
FIG. 1 depicts, in a functional block diagram, an exemplary computer aided manufacturing system.

Embodiments include an exemplary CAM system 100, as illustrated in a functional block diagram in FIG. 1. The system comprises a machining apparatus 130 and a device 102 comprising a planning module 110 and a numerical code generator 120. The planning module 110 has a processing module and the numerical code generator 120 may be a separate processing module or may be embodied as computer-executed instructions that are executed by the processing module of the planning module. Numerically controlled machines are automatically operated by commands received by their processing units. The machining apparatus 130 may provide a machining tool or cutting tool, and may reorient the cutting tool relative to a workpiece according to instructions provided by the numerical code generator 120. The position of the cutting tool may be expressed in three absolute positions, i.e., XYZ, and two rotary positions, i.e., A—a rotary position about X, and B—a rotary position about Y. The numerical code generator may be responsive to the output of the planning module 110. The planning module may have access to one or more databases 140 comprising computer-based models of: (a) features defining the channel workpiece to be machined 141 (typically left wall and right wall plus a bottom surface); (b) geometric options 142 relative to the analysis of the channel surface being machined and the way that information may affect the shape that the curve described by the end point of the cutting tool will have (such a curve is known as the tool-path); (c)

technological options 143 expressing: i) the relative position between the cutting tool of the machining apparatus 130 and the workpiece, and ii) the overall evolution of the roughing strategy; and (d) auxiliary movements 144 that may include: (1) instructions for approaching the workpiece; (2) instructions for departing the workpiece; and (3) instructions for movements linking machining sub-areas.

Via a user interface 150, a user of the system 100 may select files or objects from the databases 140 for application by the planning module 110 to generate the numerical code 121 that may for example be G-code. The machining apparatus 130 may then receive the G-code and execute the coded instructions to drive the machine tool. For example, the device may have a user interface 150 adapted to receive a user selection from a first menu 151 where the first menu may be displayed via a touch screen, or a display and indicating device, and where the first menu 151 includes the definition of essential elements of a channel shape, e.g., a left wall, a right wall, and a bottom surface, and the device may have a user interface 150 configured to receive input from a second menu 152 where the second menu may be presented via a touch screen, a display and indicating device, a first menu 151, via a separate touch screen, or via a separate display and indicating device. The second menu 152 may include a plurality of technological options that specify the relative position and axial orientation of the tool reference points with respect to the channel shaped workpiece.

Figure 2:
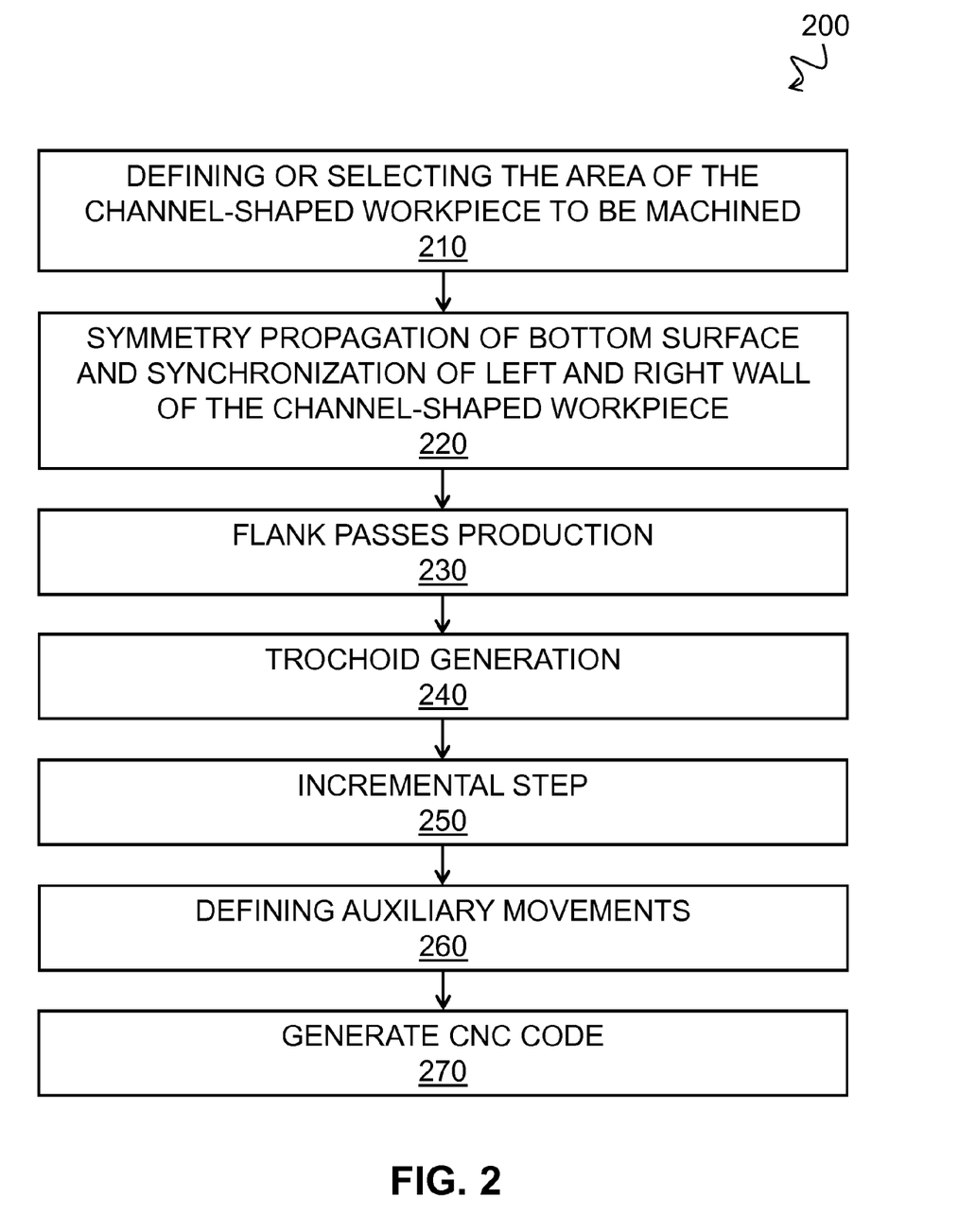
FIG. 2 depicts, in a top-level flowchart, an exemplary method of five-axis machining.

Embodiments may include an exemplary method of 5-axis machining 200, as illustrated in a top-level flowchart of FIG. 2. A 5-axis TCR machining cycle, including a planning or programming process, may comprise seven steps which may then be followed by the generation of CNC code. The exemplary seven planning steps of the 5-axis TCR machining comprise the following (a) to (g) sequence detailed below. Of the exemplary seven planning steps, only step (a) may require the direct intervention of a machine CAM operator, with the definition of simple and limited input information. All subsequent steps, steps (b)-(g), may be automatically handled by the system. The process may consist of the following steps: (a) defining or selecting the area of the channel-shaped workpiece to be machined (step 210); (b) propagating the symmetry of the bottom surface and synchronizing the left wall of the selected channel-shaped workpiece and right wall of the selected channel-shaped workpiece, i.e., the symmetry propagation and automatic synchronization step (step 220); (c) producing the flank-milling tool positions relative to the right wall and left wall, i.e., the flank pass production step (step 230); (d) joining the flank passes through pseudo-circular patterns, i.e., the trochoid generation step (step 240); (e) repeatedly replicating the previous steps (iteration) at lower levels inside the channel, i.e., the incremental step (step 250); (f) defining the auxiliary movements, i.e., the auxiliary movements step (step 260) that may include: (1) approaching the workpiece, (2) departing the workpiece, (3) movements linking machining sub-areas, and (4) finishing passes; and (g) generating the CNC code (step 270).

With the present 5-axis TCR machining method, a great variety of channel-shaped workpieces may be efficiently cut by a 5-axis CNC machine. The preliminary geometric definition step and analysis step, i.e., step 210 and step 220, allows for a channel shape to be decomposed into a flow component, which is representative of the left wall of the channel and right wall of the channel, and a depth component, all of which is influenced by the wall's shape and is representative of the channel bottom surface. The geometric analysis phase and the above-described decomposition allow the channel shape surfaces to be processed as a simpler entity to produce the corresponding trajectory of the tool. The adaptive modification of the trochoid passes according to tool engagement and curvature analysis is a further element characterizing the extreme flexibility of 5-axis TCR, where this machining method may be able to cope with a wide variety of the channel-shaped workpieces.

Figure 3:
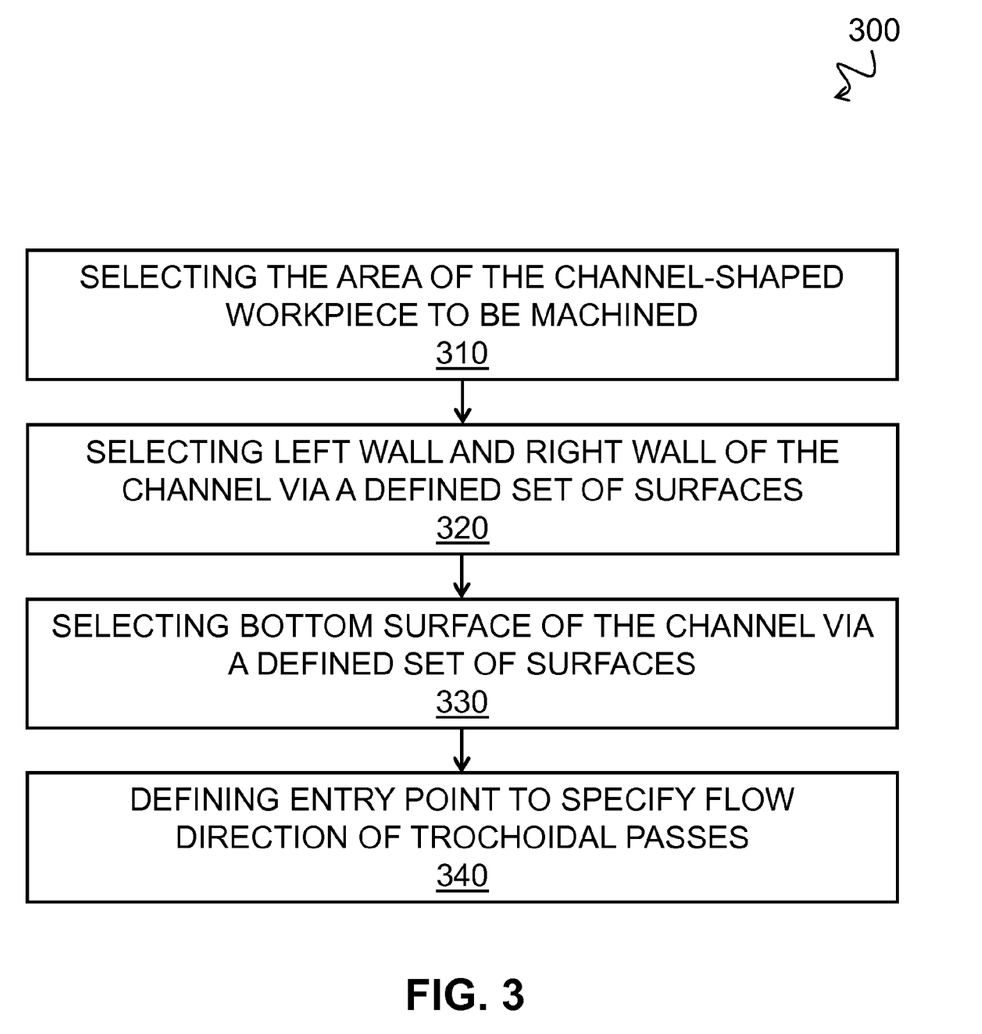
FIG. 3 depicts, in a top-level flowchart, an exemplary method of selecting the workpiece.

An exemplary method of selecting the workpiece 300 is illustrated in a top-level flowchart of FIG. 3. The part geometry selection may be the only task in the process that requires an explicit intervention of the CAM operator, as all of the other steps and stages may be automatically handled by the system. The exemplary steps comprise: (a) selecting an area of the channel-shaped workpiece to be machined (step 310); (b) selecting a right wall of the channel and a left wall of the channel via a defined set of surfaces (step 320); (c) selecting a bottom surface of the channel via a defined set of surfaces (step 330); and (d) defining an entry point of the channel, which may be used to specify the flow direction of the trochoidal passes inside the channel (step 340).

Figure 4:
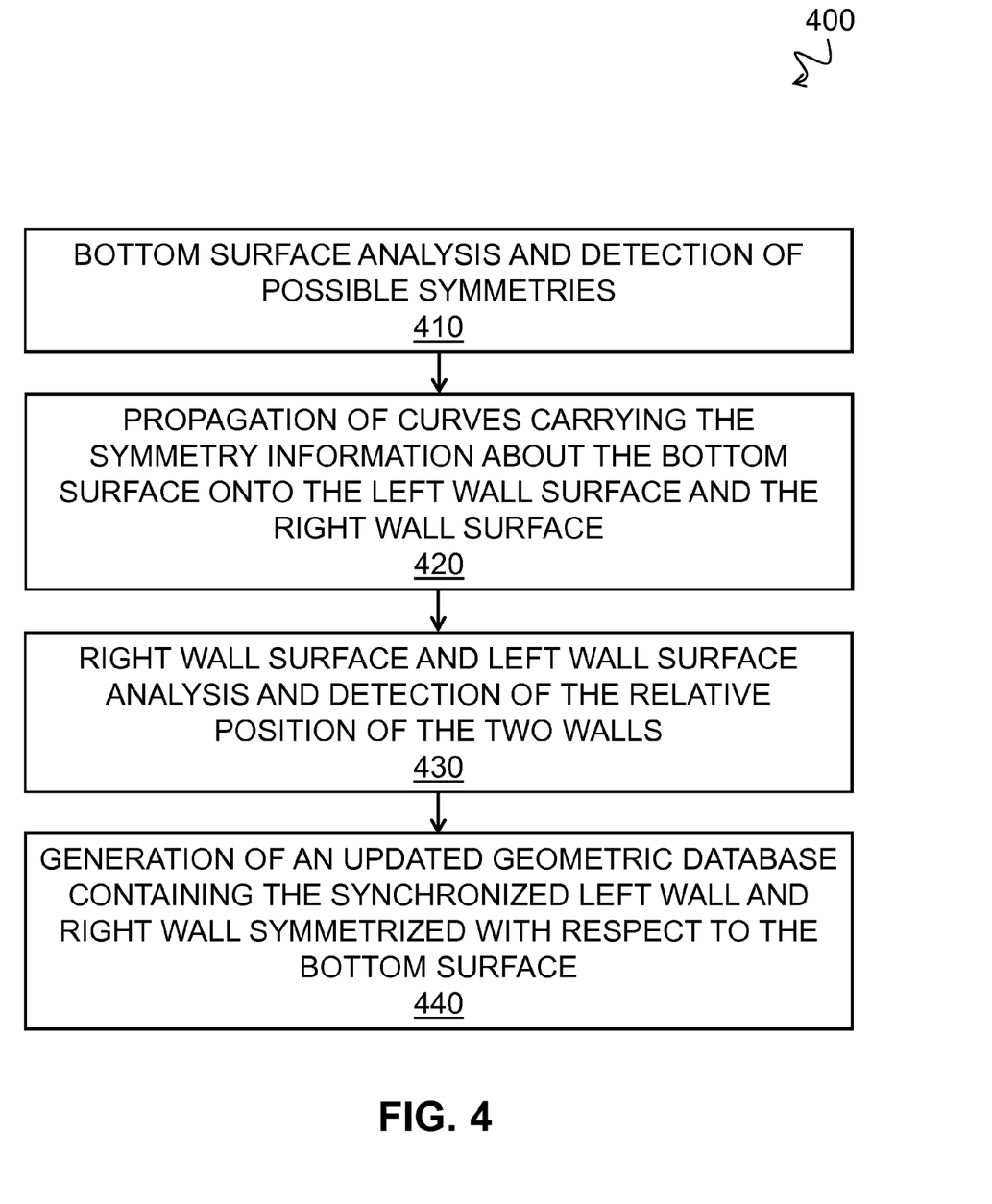
FIG. 4 depicts, in a top-level flowchart, an exemplary symmetry propagation and synchronization step.

An exemplary method of symmetry propagation and synchronization 400 is illustrated in a top-level flowchart of FIG. 4. This step may be completely automated and may not require any direct actions of the CAM operator. The exemplary steps comprise: (a) the analysis of the bottom surface and the detection of possible geometric symmetries (step 410); (b) the propagation of such information concerning the bottom surface to the left wall and right wall (step 420); (c) the detection of the relative shift position of the left wall and right wall and the definition of a three-dimensional curve describing the flow direction of the channel and equidistant from the channel walls, i.e., called a spine curve, it carries all the information about the relative shift between the walls (step 430); and (d) the generation of an updated geometric database containing the symmetrized and synchronized versions of the left wall and right wall surfaces, on the basis of the information collected in step 420 and step 430 (step 440). Possible symmetries in step 410 may include, for example, cylindrical, spherical, generic revolution surfaces, or others.

Figure 5:
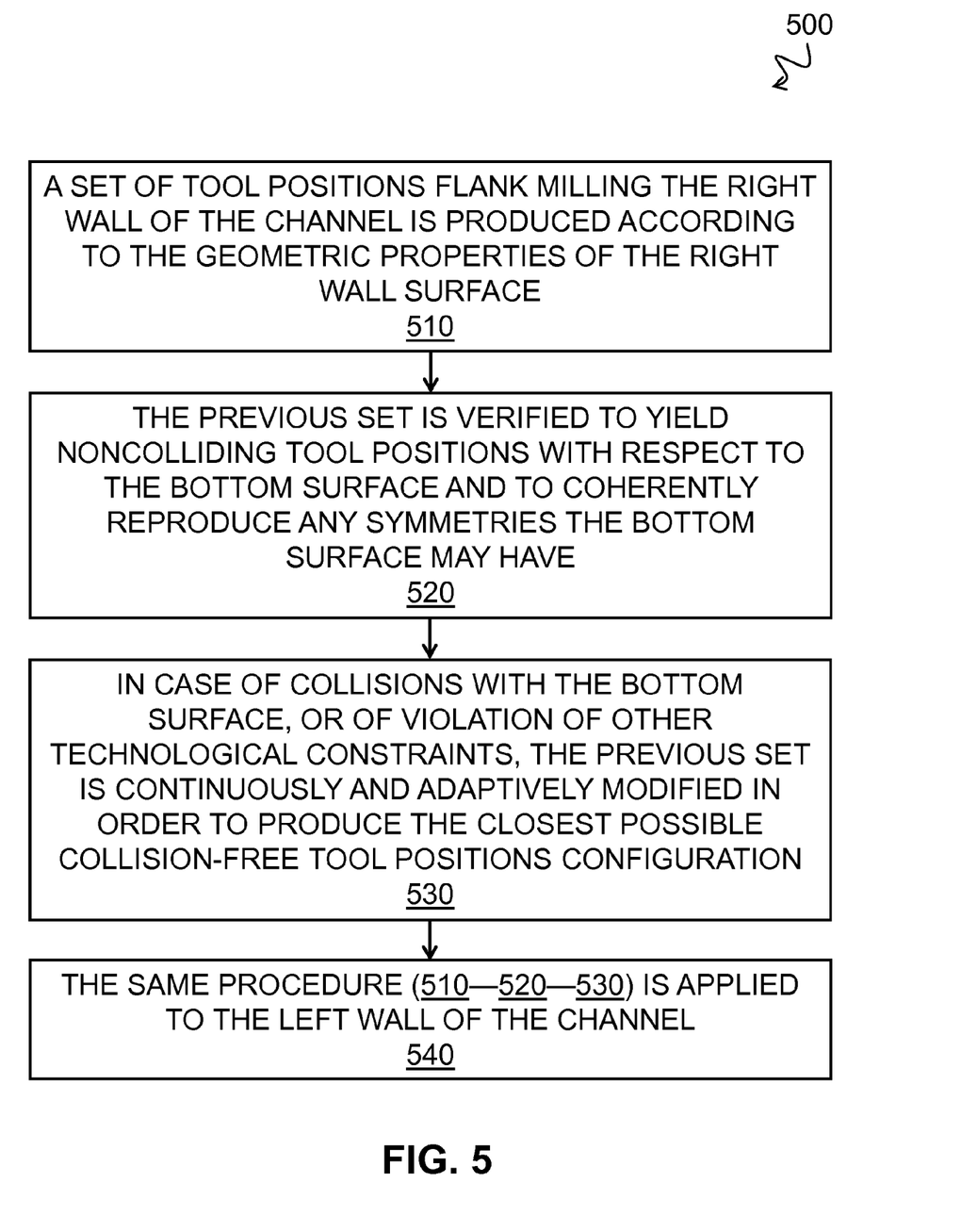
FIG. 5 depicts, in a top-level flowchart, an exemplary flank pass step.

An exemplary method of flank pass production 500 is illustrated in a top-level flowchart of FIG. 5. This may be a completely automated step involving no direct actions of the CAM operator. The exemplary steps comprise: (a) production of a set of tool positions flank milling the right wall (step 510); (b) verification of the positions previously produced against the bottom surface, and coherent reproduction of any possibly existing symmetries on the bottom surface (step 520); (c) adaptive modification of the positions previously produced in case of collision with the bottom surface, or of violation of other technological constraints, according to minimal distance criteria (step 530); and (d) application of the same procedure, i.e., step 510, step 520, and step 530, to the left wall of the channel (step 540). The set of tool positions in step 510 may be produced according to the geometric properties of the wall surface previously computed (see FIG. 4).

Figure 6:
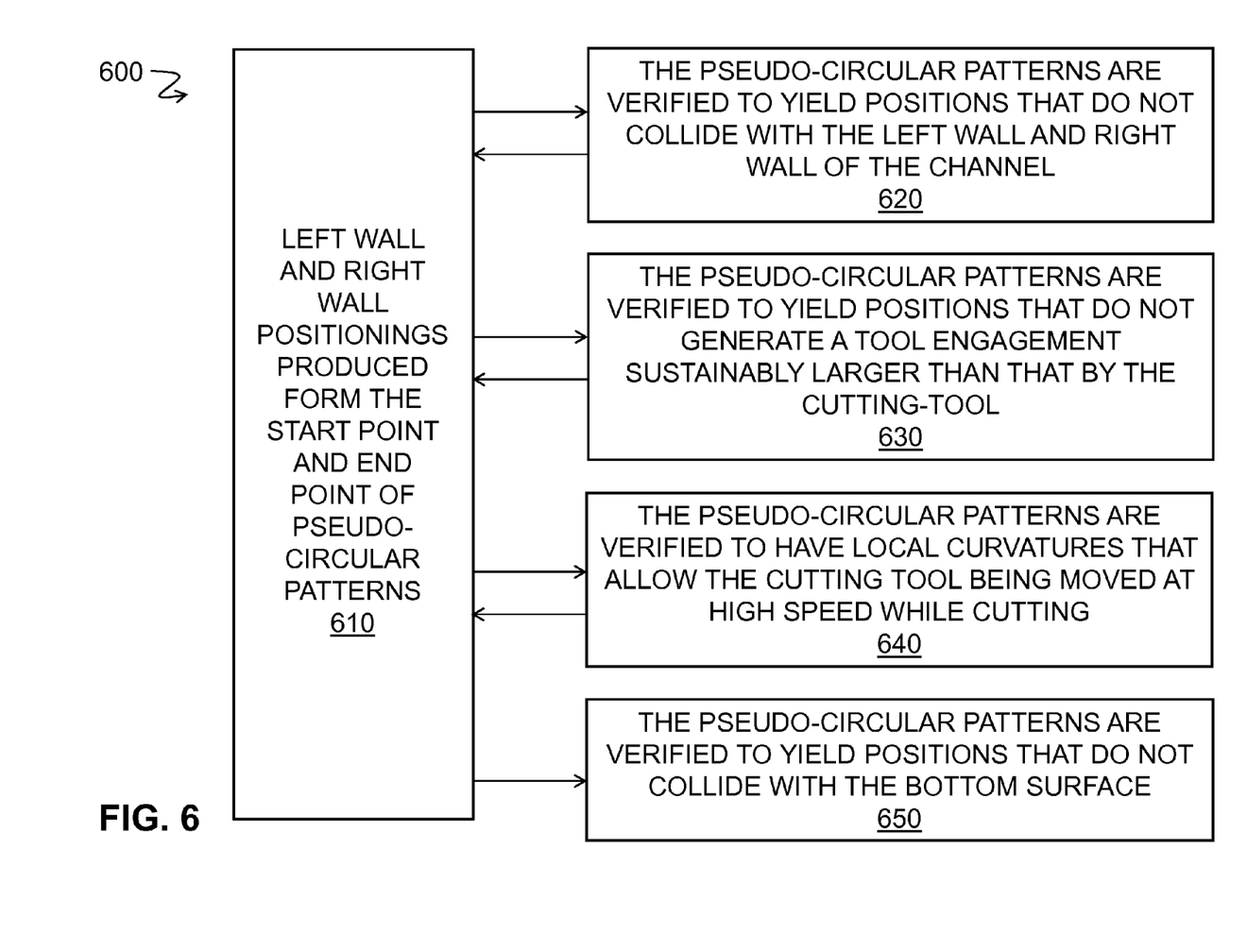
FIG. 6 depicts, in a functional block diagram, an exemplary trochoid generation step.

FIG. 6 depicts an exemplary functional block diagram of the content of the trochoid generation step 600. This may be a completely automated step involving no direct actions of the CAM operator. The exemplary steps comprise: (a) the left and right wall positions produced, and coupled, in the flank pass production step (see FIG. 5) form the start point and end point of pseudo-circular patterns (step 610); (b) the pseudo-circular patterns are verified to yield positions that do not collide with the left wall and right wall of the channel (step 620); (c) the pseudo-circular patterns are verified to yield positions that do not generate a tool engagement larger than that sustainable by the cutting tool (step 630); (d) the pseudo-circular patterns may be verified to have local curvatures that allow the cutting tool being moved at high speed, e.g., high speed machining (HSM), while cutting (step 640); and (e) the pseudo-circular patterns are verified to yield positions that do not collide with the bottom surface of the channel (step 650). The shape of the patterns in step 610 may be built according to the technological constraints specified in 152 (see FIG. 1) and/or the symmetry features determined in step 420 and step 440 (see FIG. 4). In case of collisions in step 620, the patterns may be continually or continuously and adaptively modified, i.e., an iteratively feedback driven positioning algorithm: see FIG. 7, in order to produce a close, or the closest possible, collision-free tool positions configuration. In case of over-engagement in step 630, the patterns may be continuously and adaptively modified in order to produce the closest possible controlled-engagement tool positions configuration. In case of excess of curvatures in step 640, the patterns may be continually or continuously, and adaptively modified in order to produce the closest possible controlled-curvature tool positions configuration. In case of collision with the bottom surface in step 650, each position may be shifted along its axis to produce the closest non-colliding position.

Figure 7:
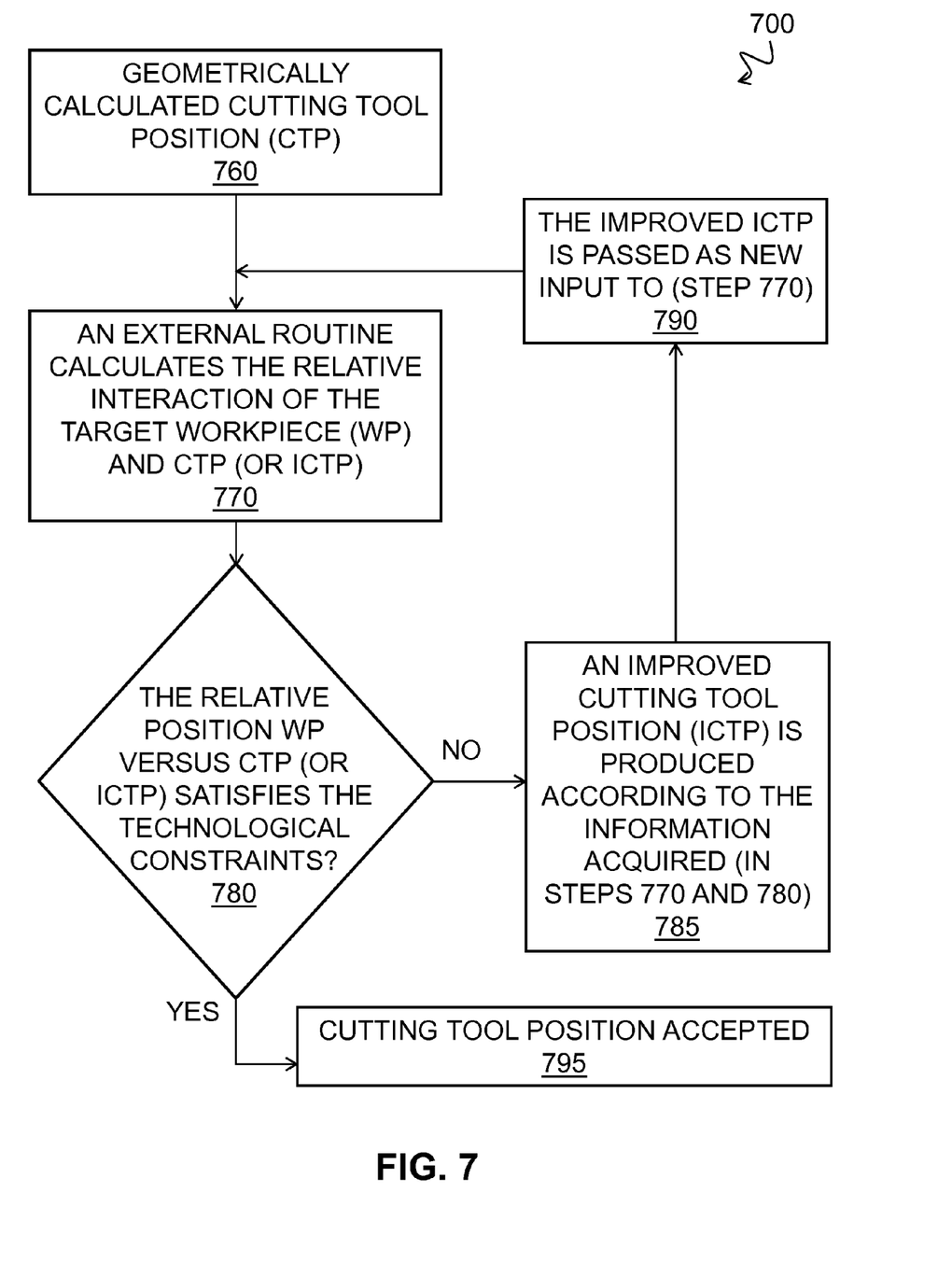
FIG. 7 depicts, in a functional block diagram, an exemplary iteratively feedback driven positioning process.

FIG. 7 illustrates in a functional block diagram, an exemplary, and iteratively feedback-driven positioning process 700. The exemplary steps comprise: (a) geometrically calculating a cutting tool position (CTP) (step 760); (b) an external routine calculates the relative interaction of the target workpiece (WP) and cutting tool position, or, if coming from step 790, improved cutting tool position (ICTP) (step 770); (c) determining whether the relative position of the WP versus the CTP, or ICTP, satisfies the technological constraints (step 780); (d) if the technological constraints are not satisfied in step 780, then an improved position ICTP may be produced, e.g., via testing on the relative interaction of the target WP and the CTP (or ICTP), according to the information acquired in step 770 and step 780 (step 785); (e) the improved ICTP is passed as new input back to step 770, and the cycle from step 785 to step 790 to step 770 and back to step 780 continues until the technological constraints are satisfied in step 780 (step 790); and (f) if the technological constraints are satisfied, then the cutting tool position is accepted (step 795).

Figure 8:
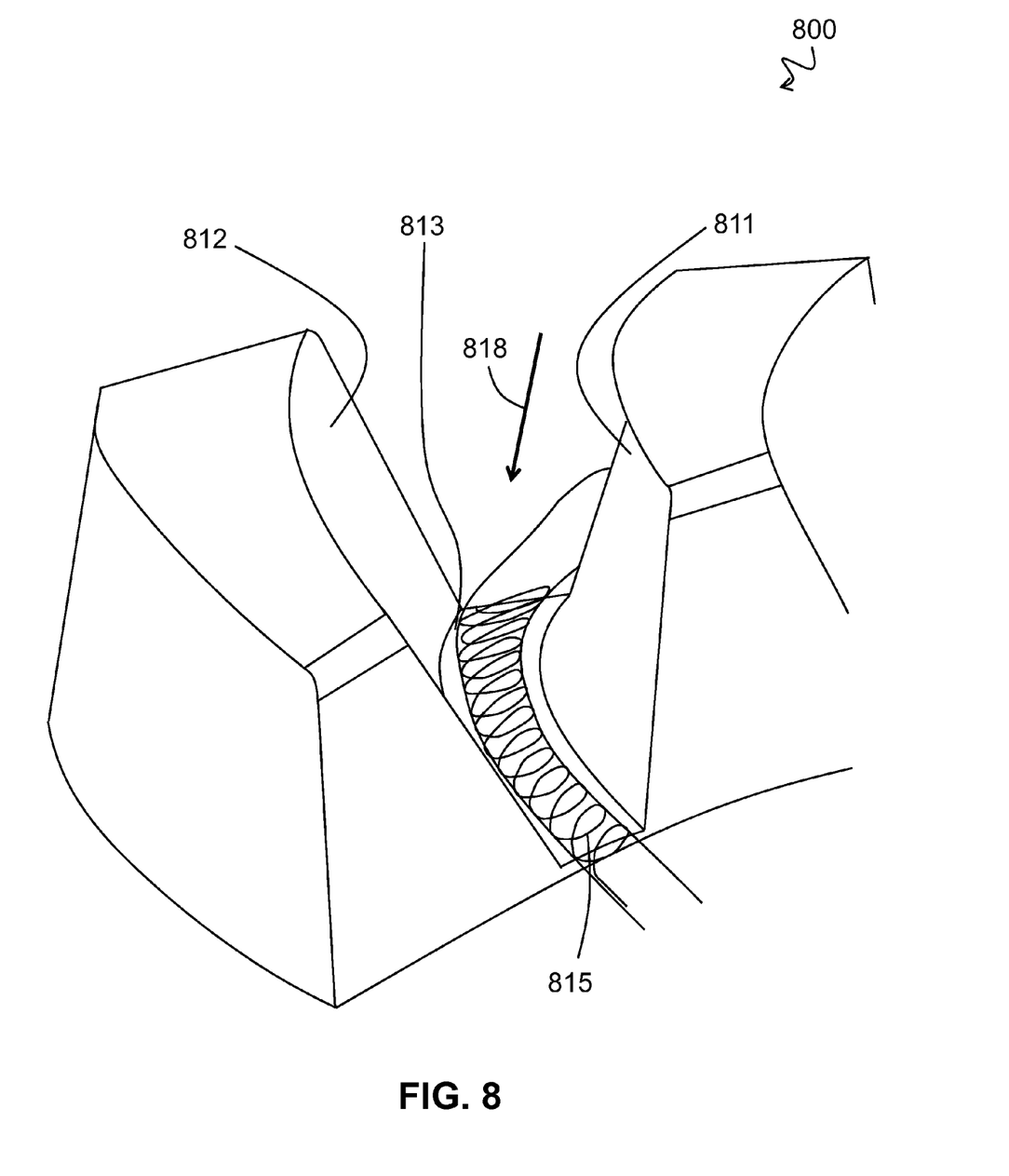
FIG. 8 depicts an exemplary channel-shaped cavity comprising an exemplary trochoidal tool path.

FIG. 8 depicts an exemplary channel-shaped cavity comprising an exemplary trochoidal tool path 800. The exemplary channel comprises a left (inner) wall 811, a right (inner) wall 812, and a bottom surface 813, which may be input by a CAM operator. An entry point 818 of the trochoidal path 815 may also be input by a CAM operator.

Figure 9:
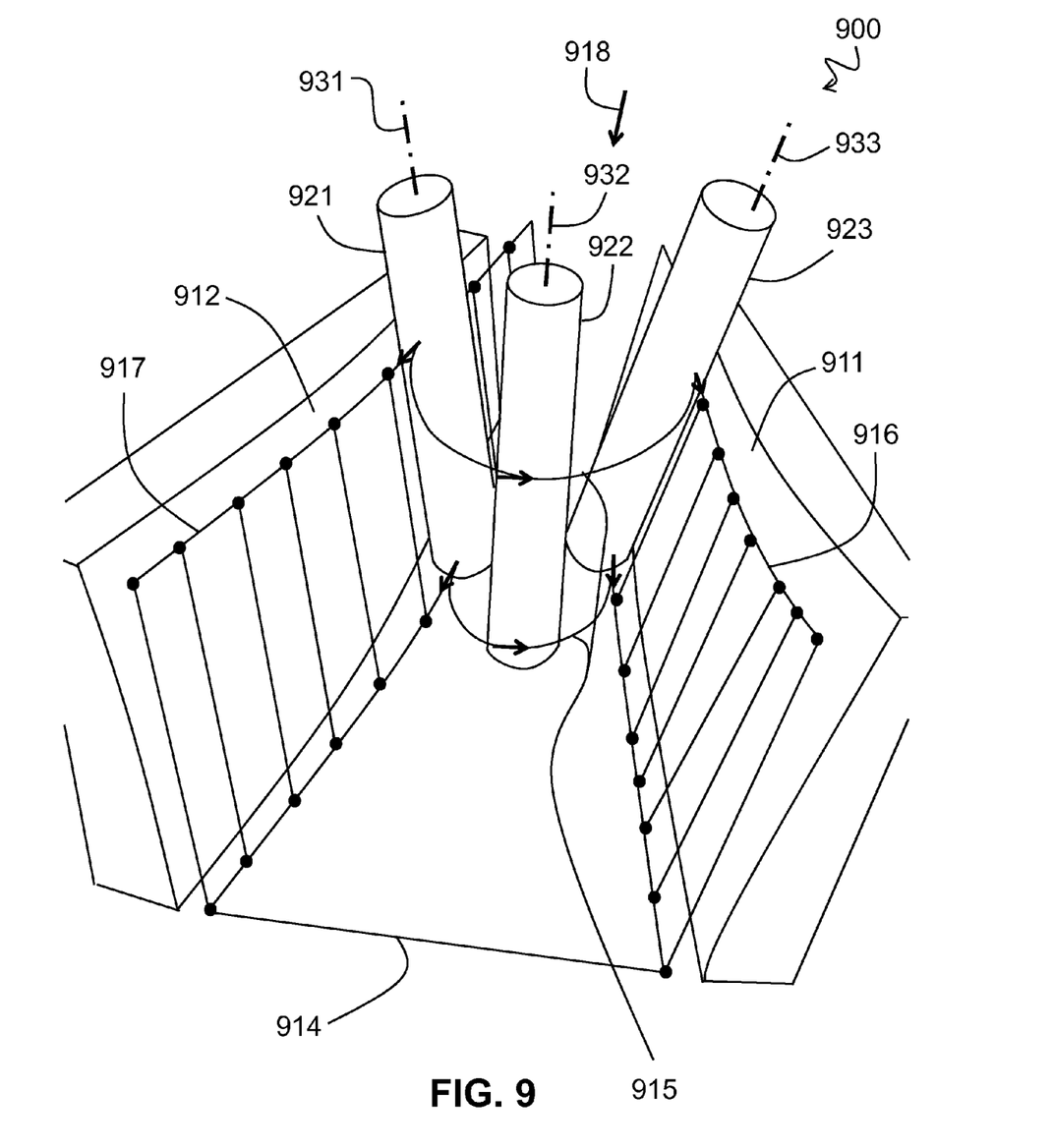
FIG. 9 depicts an exemplary tool path trajectory in a portion of an exemplary channel-shaped cavity.

FIG. 9 depicts an exemplary tool path trajectory in a portion of an exemplary channel-shaped cavity 900. The exemplary channel-shaped cavity comprises a left (inner) wall 911, a right (inner) wall 912, and an entry point 918. Start points and end points, generated during the trochoid generation step, form the left tool path axes boundary 916, right tool path axes boundary 917, and bottom tool path axes boundary 914 of the pseudo-circular trochoidal patterns 915. An exemplary flank milling tool 921,922,923 is depicted in three positions along its trochoidal path 915. In the first milling tool position 921, the milling tool is positioned according to a calculated tool path on axis 931. The milling tool then moves into a second milling tool position 922 on axis 932. The milling tool then moves into a third milling tool position 923 on axis 933. The milling tool positions move along a trochoidal path constructed based on the previously determined set of flank milling tool positions.

The incremental step described in step 250 (see FIG. 2) is a replication of the steps described in at least one of FIG. 4, FIG. 5, and FIG. 6 at lower depth-levels inside the channel. The number of replications depends on the geometric shape of the channel, the mechanical characteristics of the cutting tool used, and the degree of precision, i.e., the so-called machining tolerance, the 5-axis TCR machining is asked to provide. These parameters may also affect the relative depth-distance of two adjacent levels.

Figure 10:
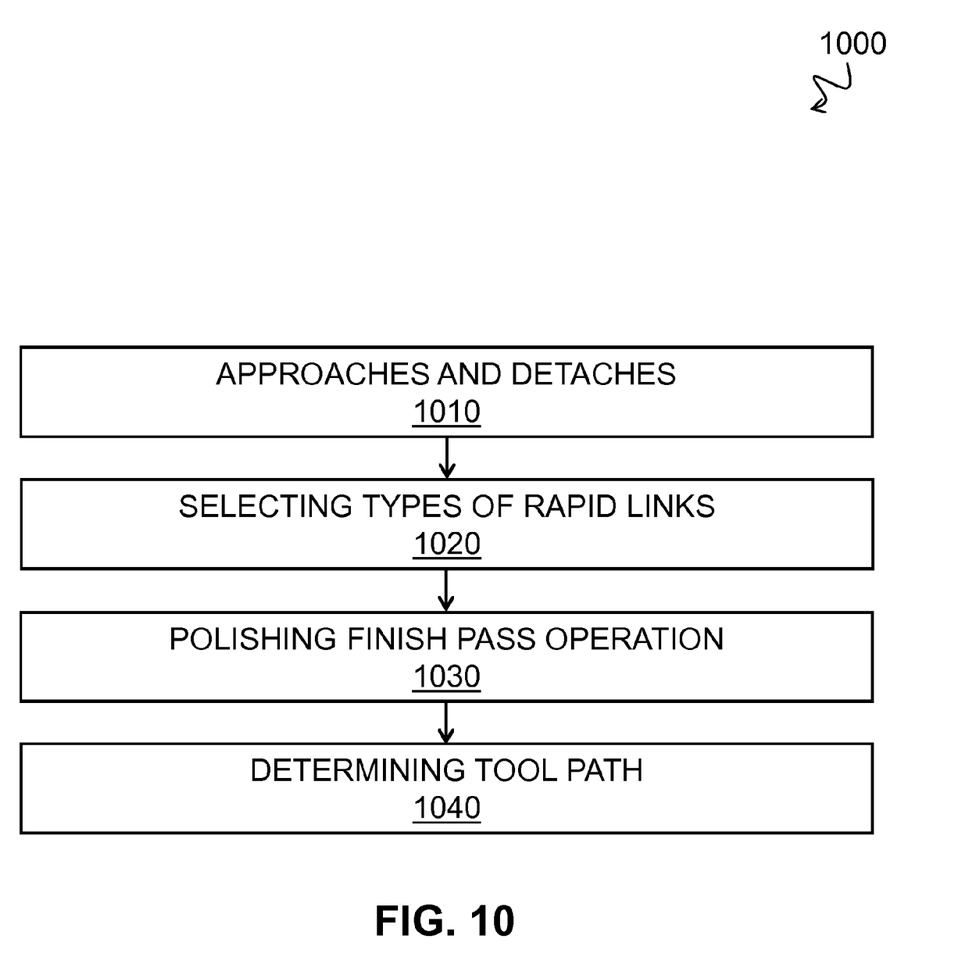
FIG. 10 illustrates, in a top-level flowchart, an exemplary auxiliary movements step.

FIG. 10 illustrates, in a top-level flowchart 1000, an addition to the tool position trajectory calculated in the auxiliary movements step. The approaches and detaches are selected as motion about a radius or radiused (step 1010). The connection between large portions, i.e., sub-areas, of the tool path may be selected as rapid links (step 1020). A polishing finish pass operation may be added to each incremental level (step 1030). With the planning complete, the tool path may be determined (step 1040). The auxiliary movement step may be checked for collision detection.

Figure 11A:
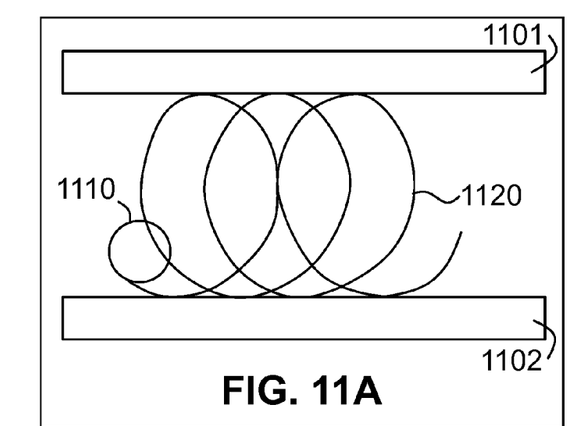
FIGS. 11A-11D depict an exemplary polishing finish pass operation.
Figure 11B:
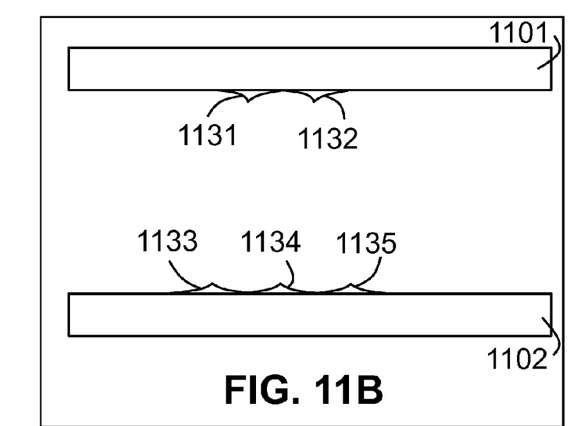
Figure 11C:
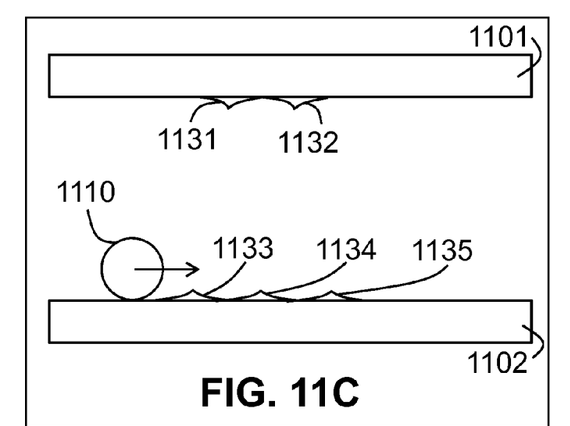
Figure 11D:
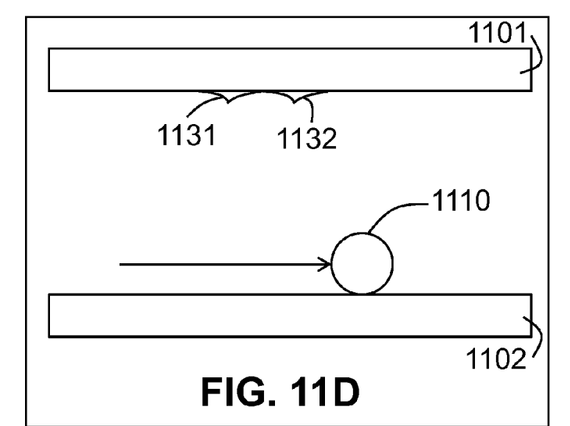

FIGS. 11A-11D depict, in a top-view of a channel, an exemplary polishing finish pass operation. The exemplary polishing finish pass operation may be performed right after the cutting tool 1110 performs the trochoidal passes 1120 of the trochoidal tool path (FIG. 11A). The finish pass may remove rough material 1131,1132,1133,1134,1135, e.g., "creases," left by the trochoidal passes of the cutting tool on the left wall 1101 and the right wall 1102. The tool positioning used to generate the trochoidal tool path may be to generate the tool path for the finish pass (FIG. 11C). The cutting tool 1110 may remove the rough material 1133,1134, 1135, e.g., "peeling," from a right wall 1102, left wall 1101, and/or bottom surface (FIG. 11D). This finishing pass may produce the desired final shape with a minimum of machining effort.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described.

What is claimed is:

1. A method comprising:
   selecting a workpiece to be machined, wherein the workpiece has a bottom surface of a channel, a left wall of the channel, a right wall of the channel, and an entry point of a five-axis machine cutting tool;
   determining a primary set of flank-milling positions of the five-axis machine cutting tool, wherein the set of flank-milling positions are determined based on the left wall of the channel and the right wall of the channel;
   determining a trochoidal path comprising a set of upper pseudo-circular patterns and a set of lower pseudo-circular patterns for the five-axis machine cutting tool, wherein the trochoidal path is based on the determined primary set of flank-milling positions; and outputting one or more cutting tool movements.

2. The method of claim 1, further comprising:
   outputting one or more cutting tool movements as one or more machine instructions, wherein the one or more cutting tool movements is based on at least one of the selected workpiece, the determined primary set of flank-milling positions, and the determined trochoidal path.

3. The method of claim 1, further comprising:
replicating, for each depth-level of an incrementally lower depth-level, at least one of:
determining a primary set of flank-milling positions of the cutting tool; and determining a trochoidal path for the cutting tool.

4. The method of claim 1, further comprising:
determining a geometric cutting tool position based on:
determining a set of geometric cutting tool positions for the selected right wall of the workpiece channel;
verifying the determined set of geometric cutting tool positions for the selected right wall of the workpiece channel for non-colliding cutting tool positions with respect to the bottom surface of the workpiece channel;
reproducing any symmetries on the bottom surface of the workpiece channel;
modifying the determined set of geometric cutting tool positions for the selected right wall of the workpiece channel if at least one of the following occurs: a collision occurs with the bottom surface of the workpiece channel, and at least one technological constraint in the defined set of technological constraints is violated;
determining a set of geometric cutting tool positions for the selected left wall of the workpiece channel;
verifying the determined set of geometric cutting tool positions for the selected left wall of the workpiece channel for non-colliding cutting tool positions with respect to the bottom surface of the workpiece channel;
reproducing any symmetries on the bottom surface of the workpiece channel; and
modifying the determined set of geometric cutting tool positions for the selected left wall of the workpiece channel if at least one of the following occurs: a collision occurs with the bottom surface of the workpiece channel, and at least one technological constraint in the defined set of technological constraints is violated.

5. The method of claim 1, further comprises:
determining a relative interaction of the workpiece to be machined based on
verifying the trochoidal path for the cutting tool does not collide with at least one of: the bottom surface of the channel, the left wall of the channel, and the right wall of the channel.

6. The method of claim 1, wherein the determining a primary set of flank-milling positions of the cutting tool is further based on the bottom surface of the channel.

7. The method of claim 1, wherein the determining a trochoidal path is further based on the entry point of the cutting tool.

8. The method of claim 1, wherein the set of upper pseudo-circular patterns and the set of lower pseudo-circular patterns are determined based on interaction of the cutting tool and the workpiece.

9. The method of claim 1, further comprising:
milling a channel-shaped cavity performed by a five-axis computer numerical control (CNC) machine, wherein the five-axis CNC machine is characterized by three translational axes and two rotary axes.

10. The method of claim 1, wherein the set of flank-milling positions are further determined based on coupling positions produced on the left wall and positions produced on the right wall.

11. The method of claim 1, wherein the trochoidal path is further based on start point and end point of the set of upper pseudo-circular patterns and the set of lower pseudo-circular patterns for the cutting tool.

12. A device for generating instructions for a five-axis machining tool, the device comprising: a processing module having addressable memory, the processing module configured to:
repeat the following steps for a channel-shaped cavity, while at least one machining limitation parameter is not satisfied:
determine five-axis machine cutting tool flow along the channel-shaped cavity;
determine five-axis machine cutting tool in-depth penetration from a top surface of the channel-shaped cavity towards a bottom surface of the channel-shaped cavity;
determine a trochoid path comprising a set of upper pseudo-circular patterns and a set of lower pseudo-circular patterns for the five-axis machine cutting tool based on the determined cutting tool flow along the channel-shaped cavity and the determined cutting tool in-depth penetration and outputting one or more cutting tool movements.

13. The device for generating instructions for a five-axis machining tool of claim 12, wherein the at least one machining limitation parameter is at least one of: the geometric shape of the channel prohibits an additional pass, and the machining tolerance is less than required for an additional pass.

14. The device for generating instructions for a five-axis machining tool of claim 12, wherein the step to determine the trochoid path for the cutting tool is further based on: an axial cutting tool engagement, a radial cutting tool engagement, at least one cutting tool speed parameter, and an interaction of the bottom surface of the channel-shaped cavity with the trochoid path.

15. A device for generating instructions for a five-axis machining tool comprising a processing module having addressable memory, wherein the processing module is configured to:
select a channel-shaped cavity to be machined, wherein the channel-shaped cavity has a bottom surface, a left wall, a right wall, and an entry point of a five-axis machine cutting tool;
determine a primary set of flank-milling tool positions relative to the right wall;
determine a primary set of flank-milling tool positions relative to the left wall;
determine cutting tool flow along the channel-shaped cavity, wherein the determined cutting tool flow along the channel-shaped cavity is based on the determined primary set of flank-milling tool positions relative to the right wall and the determined primary set of flank-milling tool positions relative to the left wall and outputting one or more cutting tool movements.

* * * * *